US009600824B2

United States Patent
Ogaz et al.

(10) Patent No.: US 9,600,824 B2
(45) Date of Patent: Mar. 21, 2017

(54) SYSTEM AND METHOD FOR RECOMMENDING HOME APPLIANCES TO A CONSUMER

(75) Inventors: Paul Ogaz, Cypress, CA (US); Arsham Hatambeiki, Irvine, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 208 days.

(21) Appl. No.: 13/118,682

(22) Filed: May 31, 2011

(65) Prior Publication Data

US 2011/0302201 A1 Dec. 8, 2011

Related U.S. Application Data

(60) Provisional application No. 61/350,565, filed on Jun. 2, 2010, provisional application No. 61/452,680, filed on Mar. 15, 2011.

(51) Int. Cl.
G06F 17/30 (2006.01)
G06Q 30/02 (2012.01)
G06Q 30/06 (2012.01)

(52) U.S. Cl.
CPC ......... *G06Q 30/02* (2013.01); *G06Q 30/0278* (2013.01); *G06Q 30/0282* (2013.01); *G06Q 30/0625* (2013.01); *G06Q 30/0631* (2013.01)

(58) Field of Classification Search
CPC ............... G06Q 30/02; G06Q 30/0625; G06Q 30/0278; G06Q 30/0631; G06Q 30/0282
USPC ........................................................ 707/799
See application file for complete search history.

(56) References Cited

U.S. PATENT DOCUMENTS

| 4,959,810 | A | 9/1990 | Darbee et al. |
| 5,872,562 | A | 2/1999 | McConnell et al. |
| 6,735,625 | B1 * | 5/2004 | Ponna ............... H04L 67/34 704/220 |
| 7,093,003 | B2 | 8/2006 | Yuh et al. |
| 7,218,243 | B2 * | 5/2007 | Hayes et al. ........ G08C 17/02 340/12.25 |
| 7,574,693 | B1 * | 8/2009 | Kemink ................. 717/121 |
| 7,612,685 | B2 | 11/2009 | Harris et al. |
| 7,653,212 | B2 | 1/2010 | Haughawout et al. |
| 8,121,901 | B2 * | 2/2012 | Blanchard et al. ....... 705/26.1 |
| 8,606,651 | B2 * | 12/2013 | Koike et al. ............ 705/26.7 |
| 8,620,769 | B2 * | 12/2013 | Yates ............. G06Q 10/101 705/14.49 |
| 2001/0049636 | A1 * | 12/2001 | Hudda et al. .............. 705/26 |
| 2002/0010623 | A1 * | 1/2002 | McCollom et al. ........ 705/14 |
| 2002/0161640 | A1 * | 10/2002 | Wolfe ....................... 705/14 |

(Continued)

FOREIGN PATENT DOCUMENTS

| WO | WO 00/28436 | * | 5/2000 | ........... G06F 17/30 |
| WO | WO 2005006304 A1 | * | 1/2005 | |

OTHER PUBLICATIONS

IEEE 100 The Authoritative Dictionary of IEEE Standards Terms, 7th ed., IEEE Press, 2000, p. 25.*

(Continued)

*Primary Examiner* — Albert Phillips, III
(74) *Attorney, Agent, or Firm* — Greenberg Traurig, LLP

(57) ABSTRACT

A system functions to recommend equipment expansions, additions and/or substitutions; interconnections; supplemental capabilities; features; etc. based upon a knowledge of a consumer's existing audio and/or visual system configuration.

7 Claims, 10 Drawing Sheets

(56) References Cited

U.S. PATENT DOCUMENTS

| | | | |
|---|---|---|---|
| 2003/0095141 A1* | 5/2003 | Shah et al. | 345/735 |
| 2003/0103088 A1* | 6/2003 | Dresti et al. | 345/835 |
| 2003/0179867 A1* | 9/2003 | Piepho et al. | 379/90.01 |
| 2003/0191650 A1* | 10/2003 | Turner et al. | 705/1 |
| 2004/0044574 A1* | 3/2004 | Cochran et al. | 705/14 |
| 2004/0070491 A1 | 4/2004 | Huang et al. | |
| 2004/0126123 A1* | 7/2004 | Koga et al. | 399/24 |
| 2006/0288300 A1* | 12/2006 | Chambers et al. | 715/744 |
| 2007/0214180 A1* | 9/2007 | Crawford | 707/104.1 |
| 2007/0266097 A1* | 11/2007 | Harik et al. | 709/204 |
| 2008/0147827 A1* | 6/2008 | Morris | 709/220 |
| 2008/0183852 A1* | 7/2008 | Pramer et al. | 709/223 |
| 2008/0249968 A1* | 10/2008 | Flinn et al. | 706/14 |
| 2009/0030872 A1* | 1/2009 | Brezina et al. | 707/1 |
| 2009/0064279 A1* | 3/2009 | Ardolino | 726/3 |
| 2009/0132698 A1* | 5/2009 | Barnhill, Jr. | H04L 12/2809 709/224 |
| 2009/0327727 A1 | 12/2009 | Meijer et al. | |

OTHER PUBLICATIONS

Internet Terminal MAT972 Owners Manual, 1998, pp. 1-44.*
IEEE 100 The Authoritative Dictionary of IEEE Standards Terms 7th Edition, 2000, p. 1011.*
What is Interprocess Communication (IPC)? A Word Definition From the Webopedia Computer Dictionary, Jan. 1, 2007, pp. 1-2.*
Using IPC channels and .NET Framework 2.0 to communicate between processes TechRepublic, Dec. 12, 2006, pp. 1-14.*
Roush, Turning the iPhone Into a Universal Remote, ThinkFlood Shows Off New Gadget, Jun. 3, 2009, pp. 1-4.*
Interprocess Communication on Windows CE, Jul. 13, 2005, pp. 1-7.*
IBM, Consumer Friendly Configuration of Computing Equipment, especially pervasive computing equipment, Mar. 1, 2001, p. 1.*
The International Bureau of WIPO, Int. Preliminary Report on Patentability of PCT Application No. US2011/38741, 9 pages.
European Patent Office, extended European search report issued on EP patent application No. 11790327.8, dated Feb. 29, 2016, 7 pages.

* cited by examiner

| Feature | Availability | Value | Rating |
|---|---|---|---|
| Product A | | | |
| Feature 1 | Yes | Parameter 1 | 8 |
| Feature 2 | Yes | Parameter 2 | 5 |
| Feature 3 | No | Parameter 3 | 0 |
| Feature 4 | Yes | Parameter 4 | 3 |
| etc... | ... | ... | ... |
| Product B | | | |
| Feature 1 | Yes | Parameter 1 | 6 |
| Feature 2 | Yes | Parameter 2 | 9 |
| etc... | | | |
| Product C | | | |

Figure 8

SYSTEM AND METHOD FOR RECOMMENDING HOME APPLIANCES TO A CONSUMER

RELATED APPLICATION INFORMATION

This application claims the benefit of U.S. Provisional application No. 61/350,565, filed Jun. 2, 2010, and U.S. Provisional application No. 61/452,680, filed Mar. 15, 2011. The disclosure within each of these applications is incorporated herein by reference in its entirety.

BACKGROUND

Personal communication, productivity, and entertainment devices such as cellular phones, PDAs, portable email devices, tablet computers, e-books, hand-held games, portable media players, etc. (all referred to hereafter as "smart devices") are known to include features such as graphical user interfaces on color touch screens, Bluetooth and/or WiFi capability, etc. Increasingly, such smart devices also incorporate support for ancillary applications (hereafter referred to as "apps") for example calendars, email, maps and navigation, etc. Such ancillary applications may be pre-installed in a smart device or may be made available for download by a consumer.

Portable controlling devices capable of commanding the operation of multiple consumer appliances of different type and/or manufacture, such as universal remote controls, and the features and functions offered by such devices are also well known in the art. Sophisticated implementations of these devices incorporate technologies such as color touch screens, wireless home network compatibility, user configurable graphical user interfaces, slave relay stations positioned to control appliances not situated in line of sight of the controlling device, etc. In some cases such controlling device functionality may be offered in the form of an app for installation on a existing smart device, said app comprising a GUI to be used in conjunction with supplemental hardware and/or firmware, built-in or external to the smart device, suitable for the generation of appliance command signals. In other cases, such controlling devices may be self-contained units specific to that purpose such as for example Nevo® brand products from Universal Electronics Inc., or Harmony® brand products from Logitech Inc.

Regardless of the exact manner in which universal controlling device functionality is implemented, in general such devices or apps may require configuration or "set up" prior to use, i.e., an appropriate set of command data from within a library of command data sets must be associated with each of the specific appliances to be controlled, for example by entry of data that serves to identify each intended target appliance by its make, and/or model, and/or type; by testing various command formats sequentially, via command transmissions, until an appliance response is observed; by sampling signals of original equipment remote controls; etc.; all as known in the art. Since systems and methods for setting up universal controlling devices to command the operation of specific home appliances are well-known, these will not be described in greater detail herein. Nevertheless, for additional information pertaining to setup procedures, the reader may turn, for example, to U.S. Pat. Nos. 4,959,810, 5,872,562, 7,093,003, 7,653,212, or 7,612,685 all of which are incorporated herein by reference in their entirety.

As will be described in detail hereafter, once such controlling device setup has been successfully performed, information regarding a consumer's appliance configuration gathered thereby may be advantageously used to provide additional services to the consumer, such as advice in the selection of additions or replacements to an existing equipment configuration, recommendations for preferred interconnections, etc.

SUMMARY OF THE INVENTION

This invention relates generally to the configuration of home appliance systems, and in particular to methods for recommending equipment expansions, additions and/or substitutions; interconnections; supplemental capabilities; features; etc. based upon a knowledge of a consumer's current equipment configuration.

To this end, in an exemplary embodiment a smart device based application may offer, for example, a home appliance recommendation feature. Such a smart device application may draw upon locally-stored equipment configuration information, for example setup data gathered by a co-resident smart device remote control app; or may access a network server to which configuration data has previously been uploaded by a separate universal controlling device and/or otherwise supplied by a user of such a universal controlling device, for example as described in U.S. Pat. Nos. 7,093,003, 7,743,012, or 7,612,685 all of which are incorporated herein by reference in their entirety. Based upon knowledge of what home appliances currently comprise a consumer's audio-visual "AV" system, such a smart device application may utilize a local or a server based application to obtain recommendations for upgrades and/or additions to the consumer's home appliance system configuration(s). These recommendations may be based on the known capabilities of the consumer's home appliances, what home appliances others have purchased in the past together with the consumer's home appliances, and/or what additional home appliances other consumers with similar equipment have configured for use in their systems.

In some embodiments, such a smart device application may also be optionally linked to a social networking account such as Facebook in order to obtain feedback and opinions from a consumer's friends regarding, for example, the consumer's AV system setup and/or the proposed system upgrade/addition recommendations.

Consumers wishing to explore how they may upgrade their current home appliances may thus avail themselves of a service provider's, manufacturer's, and/or vendor's expertise based, for example, upon a database derived from configuration data obtained from other consumers with similar system configurations, from retailers of home appliances (e.g., what home appliances have been purchased together by consumers in the past, been configured together, etc.) and the like.

The subject system may function, by way of example, by requiring a consumer to register with a provider of remote control or product advisory services, e.g., a service that allows a consumer to provide information for configuring a remote control to command operations of one or more home appliances and which captures demographic data thereby— such as disclosed in U.S. Pat. No. 7,046,161 which is incorporated herein by reference in its entirety. In certain embodiments the consumer may optionally supply to the provider of remote control or product advisory services a social network account that is to be associated with the consumer. The system may then use the home appliance information provided by the consumer, e.g., information indicative of the home appliances as used to configure the consumer's remote control to command operations of such home appliances and/or as generally provided for the purpose of seeking recommendations, to thereby determine what home appliances, services, etc. to recommend to the consumer. Generally, the recommended appliances would be upgrades to, complementary to and/or compatible with the home appliances that are currently owned by the consumer as indicated by this provided data. As noted, the determination as to what home appliances to be recommended may consider information captured by the provider of remote control services (e.g., information indicative of the AV system configurations of others), information captured by retailers, etc. In addition to providing the consumer with the recommendations so generated, the system additionally functions in a manner that allows the consumer to publish the recommendations to friends in their social network to thereby receive additional feedback from such friends.

In another aspect of the invention, consumers may utilize the smart device application to assist in making purchase decisions and/or comparing advertised products by, for example, entering brand and model number information into a smart device for submission to a network server which may dispense advice regarding compatibility and/or functionality of the contemplated equipment with that consumer's current appliance configuration.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which:

FIG. 8 illustrates a product feature database which may be used in conjunction with the algorithm of FIG. 7.

DETAILED DESCRIPTION

Figure 1A:
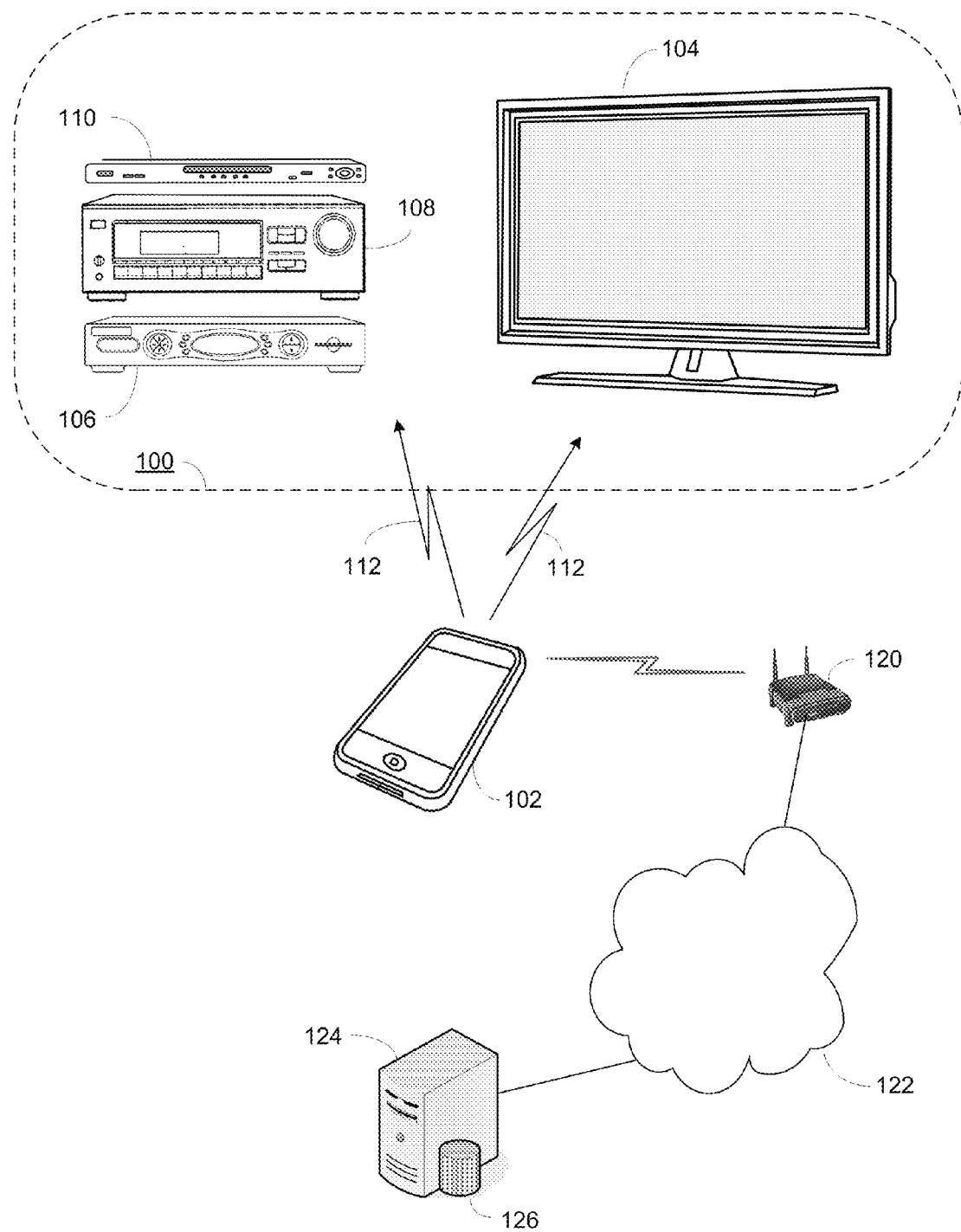
FIGS. 1a and 1b illustrate exemplary systems in which a product recommendation app according to the instant invention may be utilized.
Figure 1B:
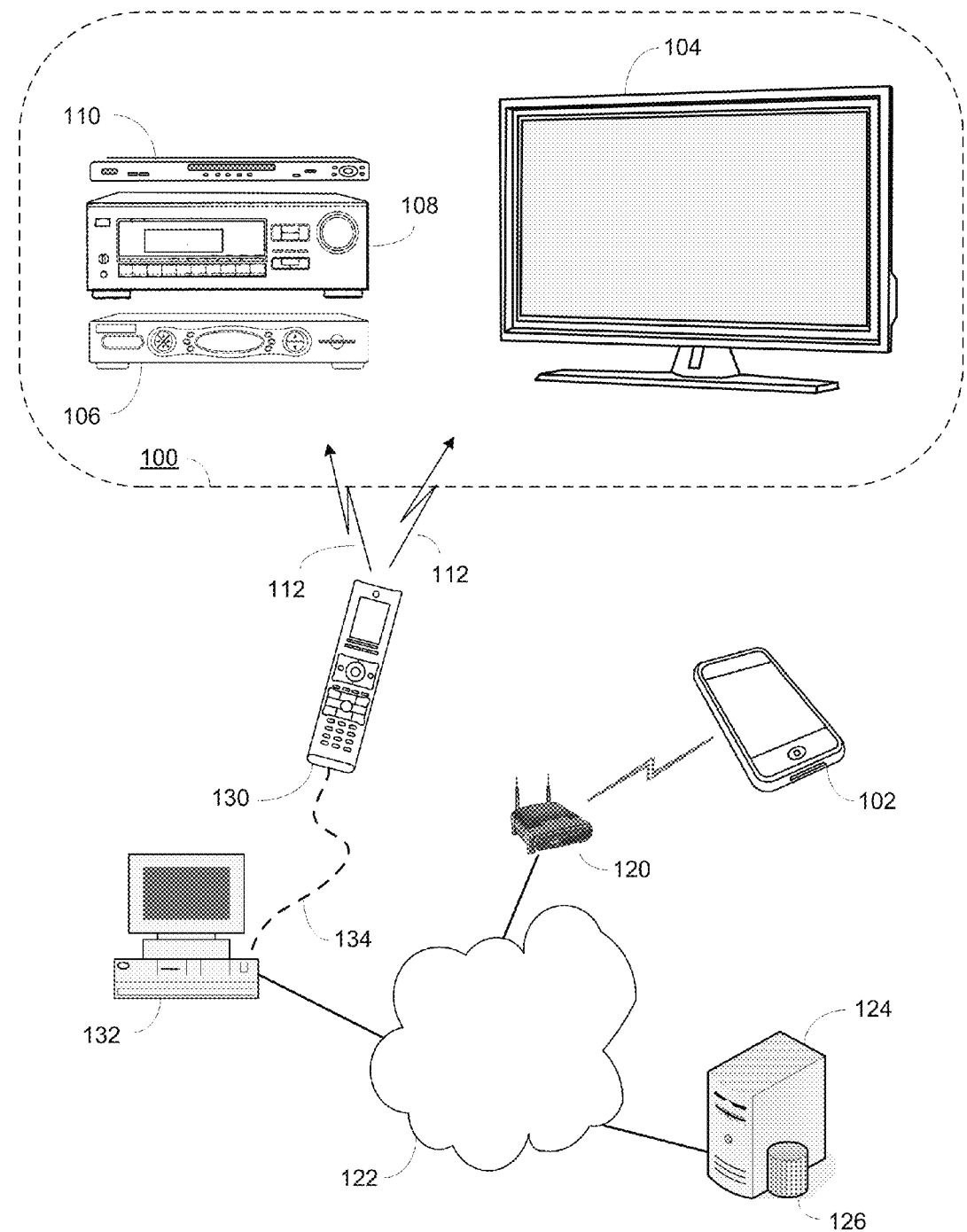

The following describes systems and methods for making recommendations to a consumer concerning additions and modifications to an existing system of electronic consumer appliances. By way of example, FIGS. 1a and 1b illustrate an exemplary system 100 wherein a smart device 102 may be used to acquire recommendations regarding a consumer's system of controllable appliances such as a TV 104, set top box (STB) 106, AV receiver 108, DVD player 110, etc. While illustrated in the context of a home entertainment system comprising a TV, STB, DVD player and AV receiver, it is to be understood that controllable appliances may include, but need not be limited to, televisions, VCRs, DVRs, DVD players, cable or satellite converter set-top boxes ("STBs"), amplifiers, AV receivers, CD players, game consoles, home lighting, drapery, fans, HVAC systems, thermostats, personal computers, etc. In the illustrative example of FIG. 1a, a smart device 102 includes a both a product recommendation app and a resident universal remote control app, which apps may be provisioned separately or in combination as a package as appropriate for a particular embodiment. The universal remote control app serves to adapt smart device 102 to command the operation of the illustrated appliances while the product recommendation app serves to advise a user of smart device 102 regarding suitable additions or substitutions to equipment configuration 100 as will be described in detail hereafter. Appliance commands may be issued in the form of infrared signals 112 as illustrated, or in any suitable format, e.g., via an RF signal such as contemplated by RF4CE, Zigbee, Bluetooth, etc.; ultrasonic signal; visible light; etc. as appropriate for the control of each particular appliance. In the example of FIG. 1a these command signals may be issued directly by smart device 102 using, for example, the technology described in co-pending U.S. patent application Ser. No. 13/043,915 or alternatively may be issued by a relay device (not illustrated) which is in wireless communication with smart device 100 using, for example, the technology described in co-pending U.S. patent application Ser. No. 13/071,661, both of which are incorporated herein by reference in their entirety. In addition, smart device 102 may be capable of communicating with a server 124 via, for example a WiFi or cellular wireless access point 120 and a wide area network 122 such as the Internet or PSTN. Server 124 may support a database 126 comprising downloadable command codes and data, equipment setup configurations, appliance datasheet and compatibility information, recommendation database, etc. as required for a particular embodiment.

As illustrated in FIG. 1b, in an alternative configuration appliance control functionality may reside in a physically separate device such as a universal remote control 130. Remote control 130 may be configurable via a PC 132, standalone or in conjunction with a server-based database 126, using any convenient wired or wireless connection 134 as is well known in the art. In alternative embodiments remote control 130 may communicate directly with server 142 via a wireless link (not illustrated) and access point 120. In the examples of both FIGS. 1a and 1b however, appliance setup data, i.e., type, brand, and model information, equipment configuration, etc., that is gathered during setup and programming of a universal controlling device may be made available to a product recommendation app resident in smart device 102, either directly from the controlling device 130 or from the smart device 102 accessing a server 124 to which such data has been previously provided by the controlling device 130.

Figure 2:
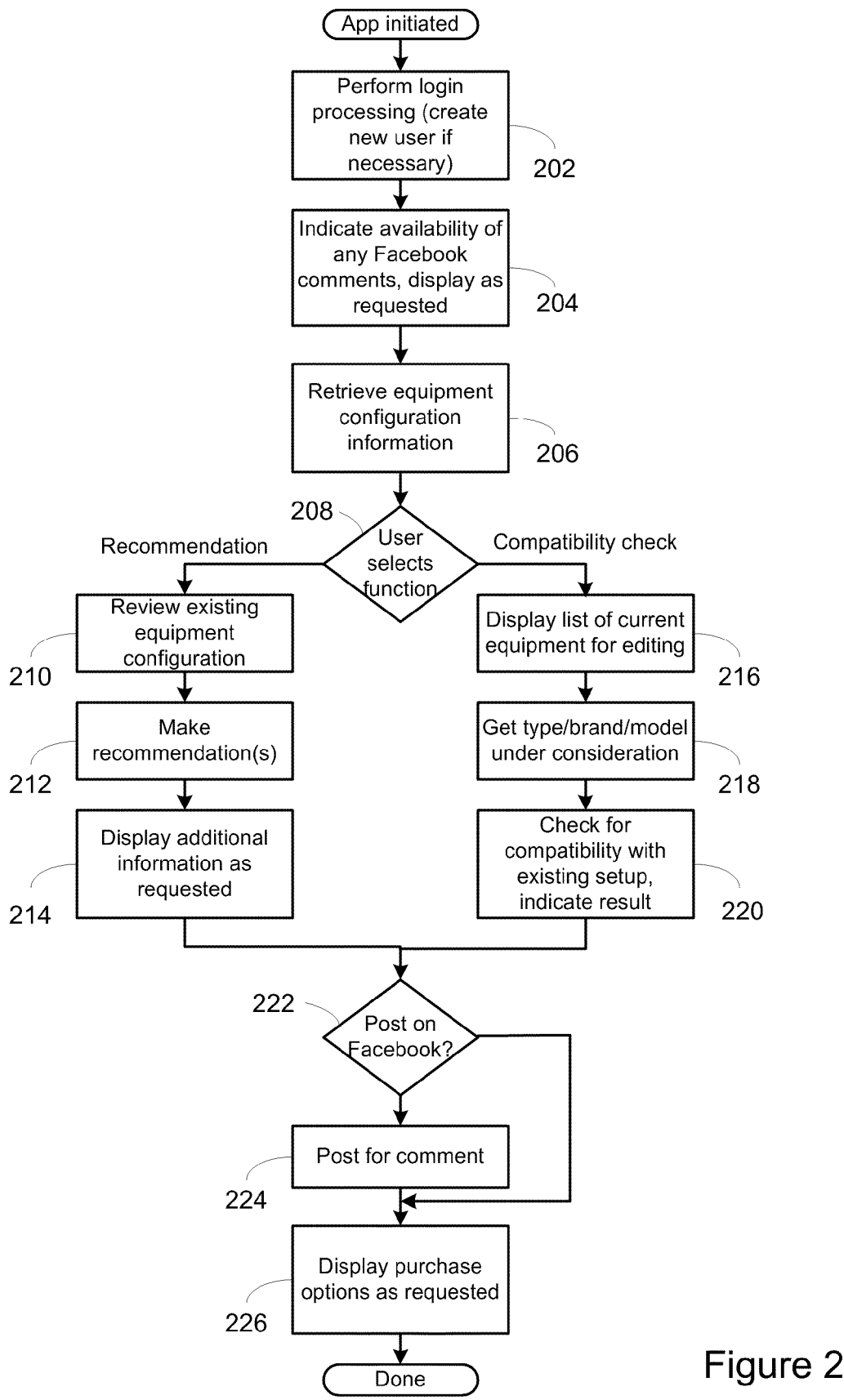
FIG. 2 illustrates, in flowchart form, the operation of an exemplary product recommendation app.
Figure 3:
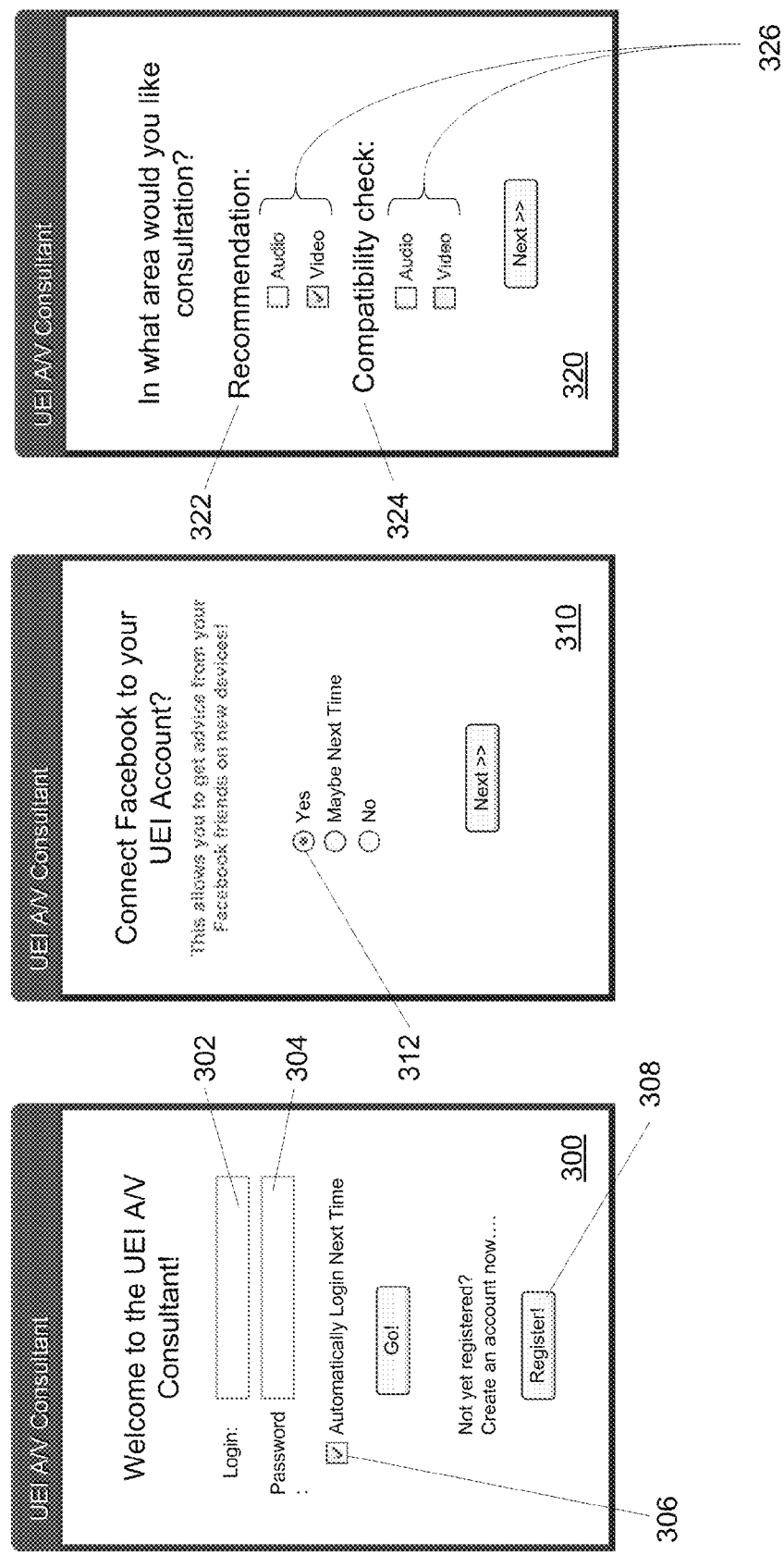
FIGS. 3 thru 6 illustrate smart device screen displays during the operation of an exemplary product recommendation app.
Figure 4:
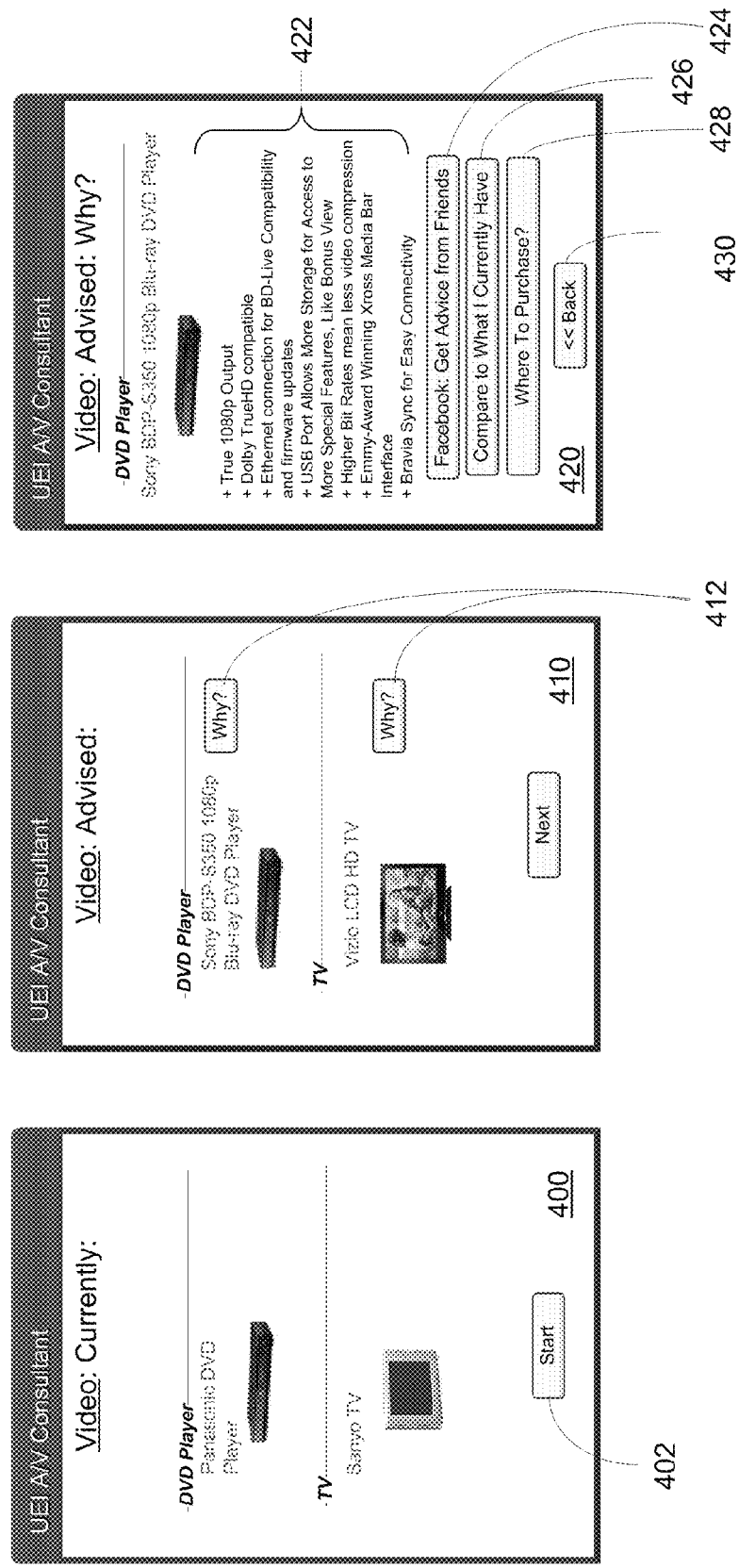
Figure 5:
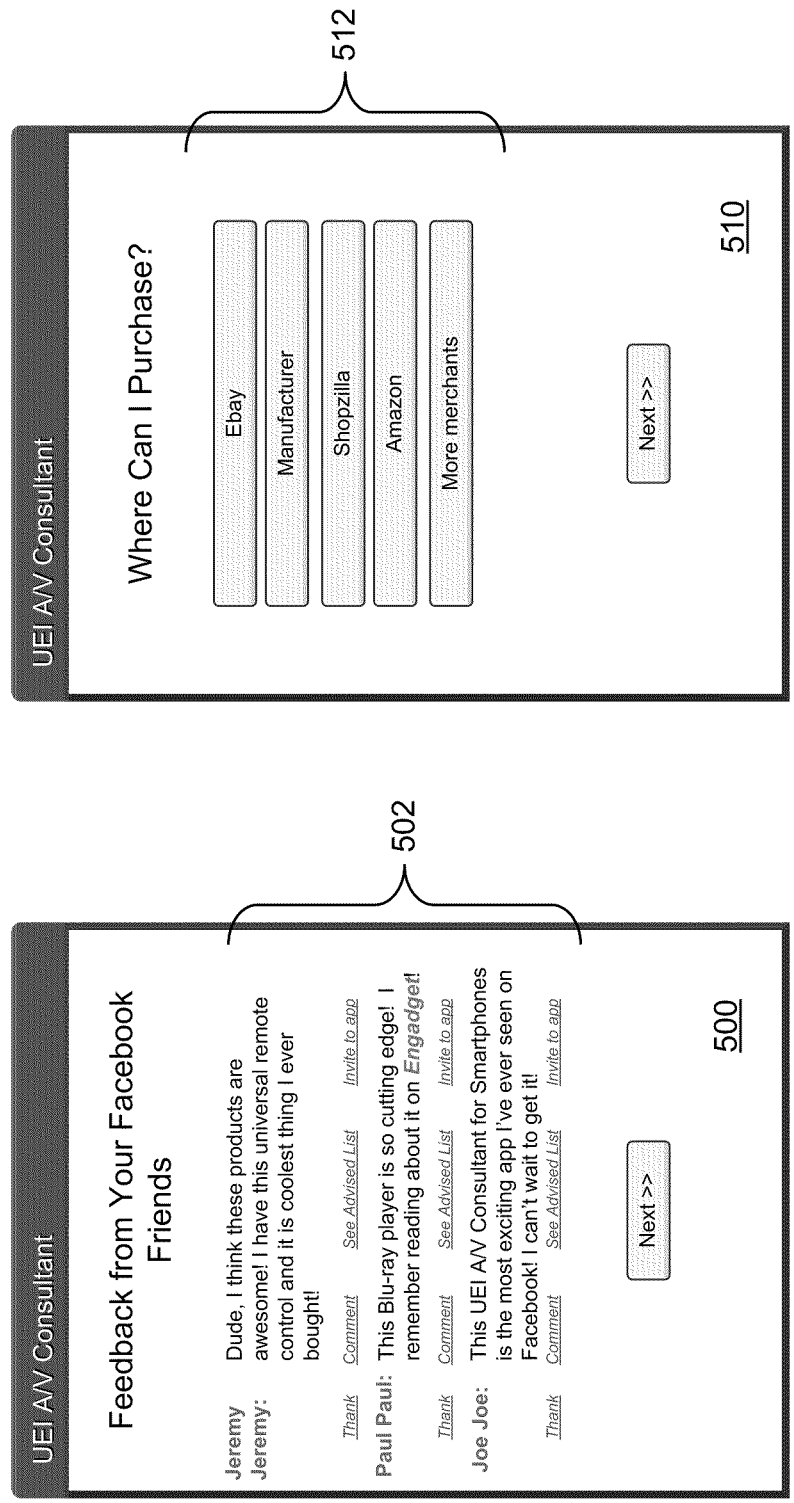
Figure 6:
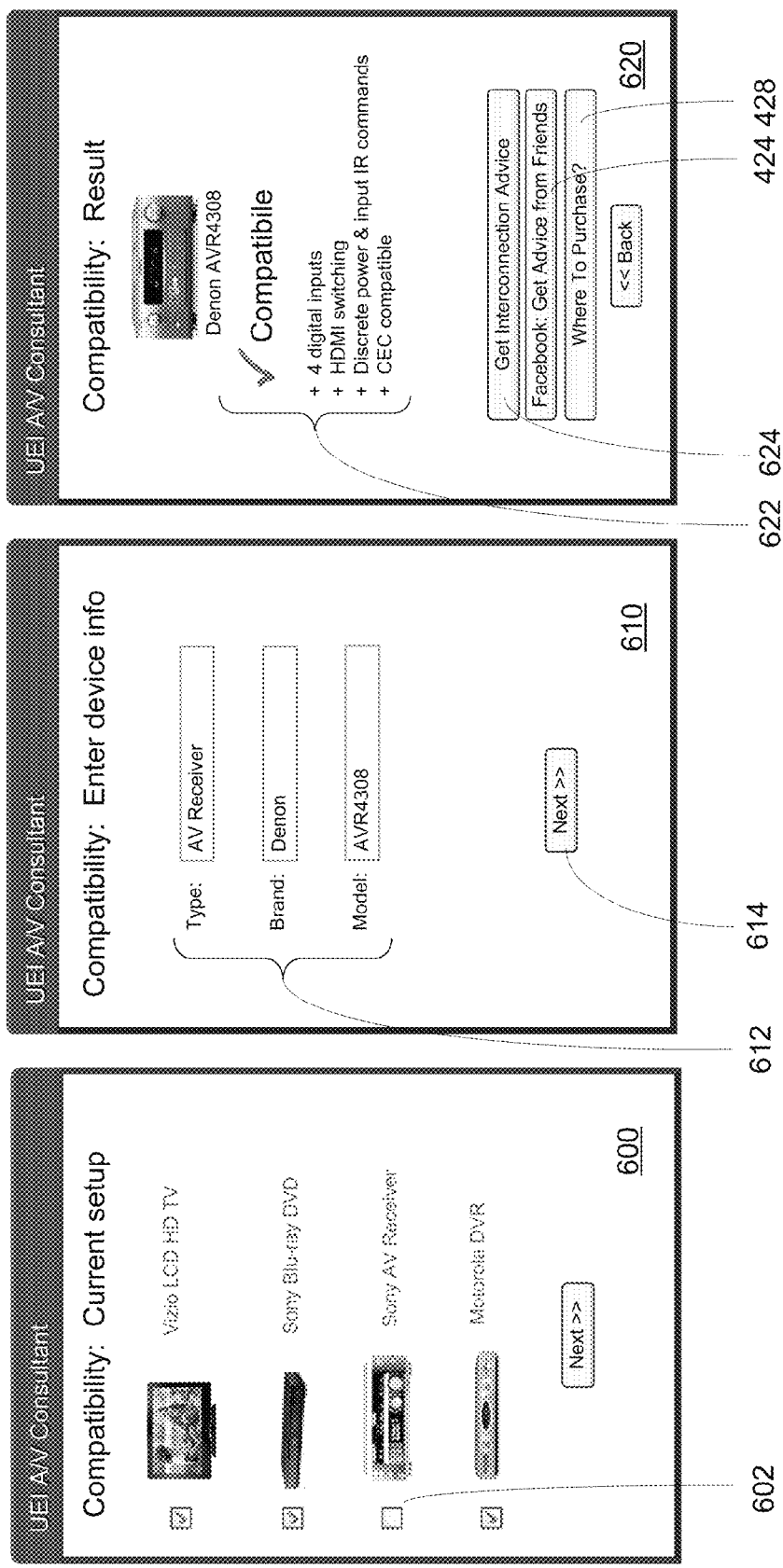

With reference now to the flowchart of FIG. 2 and accompanying illustrative screen displays of FIGS. 3 through 6, an exemplary product recommendation app, e.g., an application implemented via computer-executable instructions stored on one or more non-transient, physically embodied storage media of one or more devices such as a server, smart device, and/or the like, may, upon initialization at step 202 request that a user enter a login name 302 and password 304 which may be used to identify a particular user and their current equipment configurations. In some embodiments, this user identity may correspond to a user account which has already been created elsewhere, for example created on server 124 in connection with configuring a PC-editable remote control 130, while in other embodiments this user account identity may be unique to the product recommendation function, in which latter case a first time user may be required to register and create an account, for example by activating a "Register" icon as illustrated at 308. In either case, a user may also be able to request that the login screen be bypassed in the future, for example as illustrated by check box 306.

In addition, as part of the login process a user may be offered an opportunity to link to a social networking account such as for example, without limitation, Facebook as illustrated at 310. Selecting "Yes" 312 may take the user to a screen (not illustrated) wherein the desired Facebook account information is entered. Where the user already has a Facebook account linked to the account, at step 204 screen 310 may be substituted by a display (not illustrated) indicating whether or not here are unread friend comments pending at Facebook. If there are, at the request of the user these comments 502 may be displayed as illustrated in the exemplary computer screen 500 of FIG. 5.

Once login is complete, at step 206 the current equipment configuration data associated with that user account may be retrieved by the product recommendation app in preparation for the steps which are to follow. As will be appreciated, such configuration data may be stored locally on smart device 102, on a local PC 132, on a remote server 124, or a combination thereof as appropriate for a particular embodiment. Next, at step 208 the user is offered a choice of a product recommendation or a product compatibility check, as illustrated at screen 320. In this context, a product recommendation comprises a review of the items in a user's current equipment configuration with the objective of generally suggesting improvements and/or additions to the user's current equipment configuration; while a compatibly check comprises a review of a particular user-specified product which is not currently part of an equipment configuration, with the objective of determining if this item is compatible with the existing equipment as currently configured. As illustrated by checkboxes 326, a user may be provided with an opportunity to further limit these reviews to only certain appliances or functionalities, for example audio or video appliances or functionalities as illustrated (or both, if more than one box is checked.)

Considering first the product recommendation mode, at step 210 the existing equipment configuration may be retrieved and displayed to the user as illustrated for example at screen 400. Once a user has verified that the retrieved configuration is correct, for example by selecting "Start" 402, the listed configuration may be reviewed for adequacy and compatibility. In this regard, it will be appreciated that the steps comprising the review algorithm may be performed locally on the smart device, performed remotely at an associated server, or a combination thereof as appropriate for a particular embodiment. Similarly, it will be understood that data indicative of the current equipment configuration and data used for reference during the review process may be either locally resident on the smart device or hosted by a server, in any convenient combination.

In determining the adequacy of an existing configuration an exemplary review algorithm may, for instance when applied to the illustrative AV system configuration 100, consider factors such as:

Ability to support currently available (and/or future) formats, e.g., HDTV, Blu-ray DVD, DTS audio, 3DTV, etc.;

Ability to support currently available (and/or future) content delivery methods, e.g., on-line video and audio streaming services, IPTV, HD radio, etc.;

Ability to support currently available (and/or future) connectivity, e.g., HDMI, WiFi and/or Ethernet capability, USB and SD card interfaces, etc.;

Energy efficiency;

Inconsistencies in the existing configuration, e.g., an HD DVR or Blu-ray player connected to an SD TV.

Once any inadequacies or inconsistencies have been identified, at step 212 recommended improvements may be determined and presented to the user, for example as illustrated in screen shot 410. In this regard, factors that may be considered in identifying suggested replacements or additions to the equipment configuration may include:

Features and capabilities necessary to rectify the identified inadequacies;

Support for nascent technologies (i.e., future proofing);

Cost of proposed units, which factor may be influenced by the price brackets represented by the existing items of equipment;

Dimensions;

Operational compatibility, e.g., support for CEC, EDID, RF4CE, etc.;

Reliability and/or user satisfaction ratings;

Purchase statistics derived from a user's peer group, i.e., other consumers with similar equipment configurations and/or demographics.

In this regard, in certain embodiments, user-specified filtering parameters may also be applied during this identification process, for example upper limits on price and/or dimensions, brand preference, etc. Input of such parameters may be solicited from a user at the start of the recommendation process (i.e., in conjunction with steps 210 and 212), or may be provided during initial installation and setup of the product recommendation app, as appropriate.

In addition, in certain embodiments where a database of device command code sets is available for reference, for example where the product recommendation app is provided by or hosted by a manufacturer of universal controlling devices such as controlling device 130 or of universal remote control apps for smart devices, the suitability of an appliance's command set may also be taken into account, for example:

Availability of so-called "discrete" power and input selection commands in support of activity macros;

Preferred method of command transmission, e.g., if a majority of the other appliances in the existing configuration support non-line-of-sight command transmissions, such as for example the RF4CE protocol, preference may be given to replacement devices which are compatible with that command protocol;

Possible conflicts in command code format with appliances already present in the existing configuration; etc.

Figure 7:
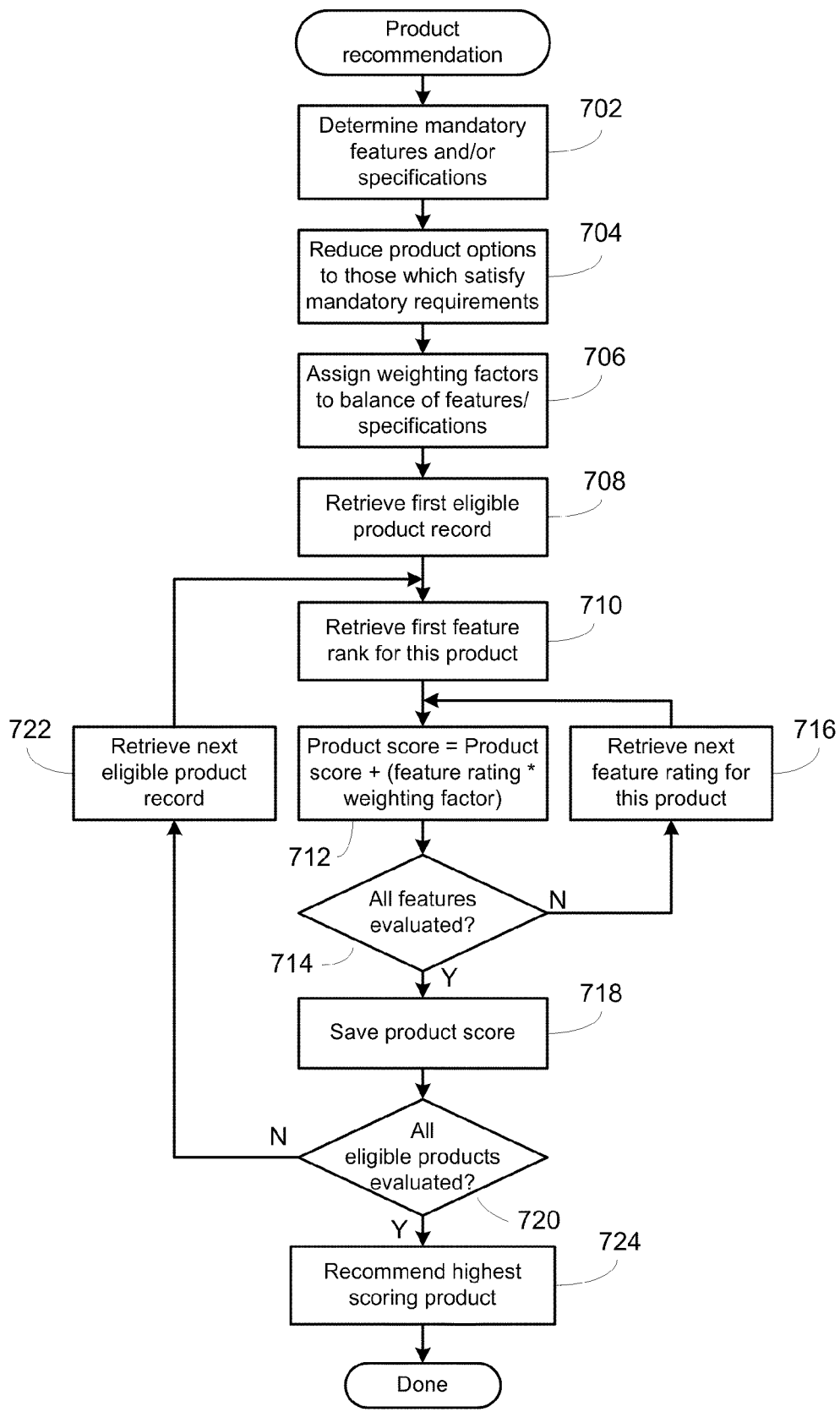
FIG. 7 illustrates, in flowchart form, an exemplary product recommendation algorithm.

By way of further example and without limitation, a product recommendation method and associated database are illustrated in FIGS. 7 and 8. Turning to FIG. 7, at step 702 first a determination is made as to which product features are mandatory. These may include for example support for formats necessary for compatibility with other existing equipment in a user's configuration (e.g., HDTV compatibility), regional requirements (supply voltage, DVD region, PAL vs NTSC, etc.), user-supplied filtering parameters such as maximum price or dimensions, etc. Next, at step 704 a product selection database may be scanned and those entries which satisfy the mandatory requirements selected as entries that are eligible for further examination. With reference to FIG. 8, an exemplary product recommendation database 800 may comprise a series of product records 810, each record in turn comprising a series of feature definition entries 812, each feature definition entry comprising a series of fields 802 through 808. Field 802 may be a feature reference or type (e.g. HD capable, HDMI input, reliability rating, user survey rating, etc.), field 804 may contain an indicator as to whether this feature is available on that particular product, field 806 may contain any parameter associated with that feature (e.g., screen resolution, number of inputs, etc.), and field 808 may comprise a rating value, e.g., between zero to ten, representative of the completeness or functionality of that particular feature as implemented within that product, or in the case of survey results, etc., a value representing a relative ranking within that appliance's peer group. For a feature which is absent, rating value entry 808 may be zero. As will be appreciated, though illustrated for convenience as a unified data set, in practice the data values corresponding to the fields of database 800 may be distributed across multiple locations, for example any or all of the fields 802 through 808 may comprise a pointer to a data value located elsewhere, such as a manufacturer's website, a product rating organization's report database, etc. In the illustrative example, any or all of the contents of fields 802 through 806 for each product maintained in the database may be examined during the initial selection process of step 704.

Once a set of qualifying products has been selected, at step 706 a weighing factor may be assigned to each of the remaining non-mandatory features based on that feature's relative importance to the known equipment configuration in which it is to be used. In some embodiments, some or all of such weighing factors may also be user-adjustable according to personal preferences, e.g., cost. After weighing factors are established, at step 708 a first product record from the set of eligible records is retrieved, and at steps 712, 714 and 716 a product score may be accumulated, calculated in the illustrative example as the sum of the products of each participating feature's rating 808 and the weighing factor established in step 706. Thereafter, at step 718 the total score for that product may be saved, and at steps 720 and 722 the process repeated until all eligible products have been scored. Upon completion of score calculations, at step 724 the highest scoring product may be returned as a recommendation and the process is complete.

Figure 9:
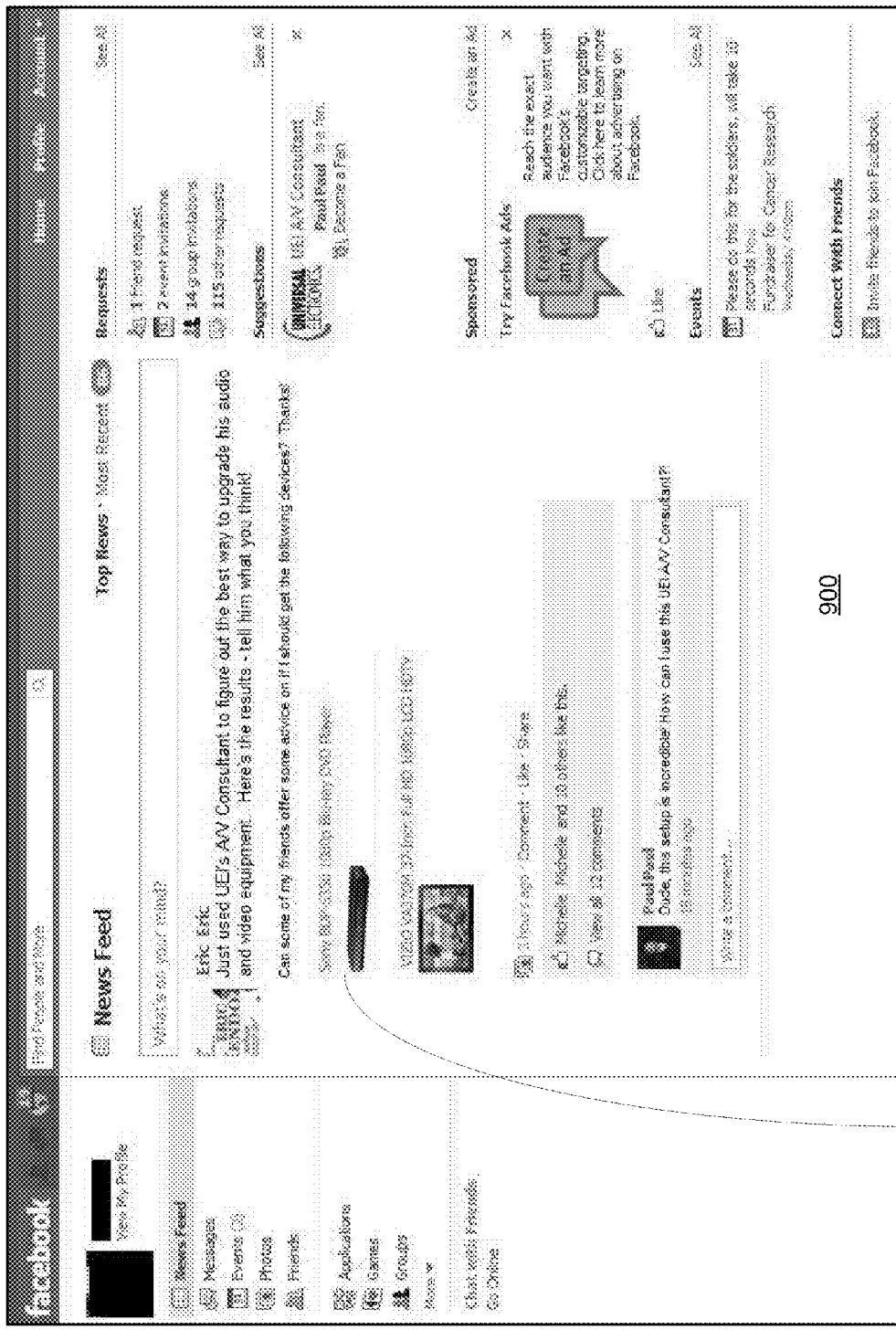
FIG. 9 illustrates an exemplary Facebook page soliciting friends' opinions regarding a recommended product.

Once suggested replacement or add-on items have been thus identified, these may be displayed to the user of the smart device, for example as illustrated 410. Returning to FIG. 2, at step 214 the user may be presented with an opportunity to display additional information regarding the recommended appliances, for example via activation of an icon 412 as illustrated. Selection of one of the icons 412 may result in the display illustrated at screen 420. This display may include a summary 422 of the features of the recommended appliance together with icons representing possible next actions by the user, for example: Posting the recommendation to a user's Facebook or other social networking account for comment using icon 424, comparison of the recommended item to the appliance it is to replace in the current configuration (if any) using icon 426, obtaining purchase information using icon 428, or returning to screen 410 to review other recommended appliances (if any) using icon 430. As illustrated in FIG. 9, selection of icon 424 at step 222 may result in the posting at step 224 of information 902 regarding the recommended appliance to that user's Facebook page 900. Selection of icon 428 may result in a display at step 226 as illustrated at screen 510, comprising a listing 512 of links to merchants selling the recommended item. As will be appreciated, such merchant information may be obtained via use of known web-scraping technologies, may be provided by the merchants themselves (e.g., via an affiliates agreement), or the like.

Considering now the product compatibility or "shopping companion" mode, a consumer may wish to use the smart device app of the current invention to verify the compatibility of a particular electronic appliance with their existing configuration, based upon for example an advertisement, a recommendation from a friend or a salesperson, a store display, etc. In such cases, after initiating the product recommendation app as described previously, at step 208 the compatibility check mode 324 may be selected. Initially, at step 216 a listing of the user's currently configured electronic appliances may be displayed as illustrated at screen 600 of FIG. 6. In the exemplary embodiment, the user may be afforded an opportunity to remove from that configuration any device which is to be replaced by the new appliance under consideration, for example by selecting a box to be "unchecked" as illustrated at 602, thereby removing that appliance from the compatibility check process which is to follow. After completing any such input, a user may confirm the remaining equipment configuration and proceed to step 218 by selecting a "next" icon 604. At step 218, the user may be prompted to identify the type, brand, and model of appliance under consideration, as represented by fields 612 of screen 610. As will be appreciated, such identification may be by selection from a drop-down list, direct text entry with or without auto-complete, etc., as appropriate. In addition, the system may automatically indentify the appliance under consideration from an uploaded photograph of the appliance under consideration, its packaging, or the like; from a captured product code associated with the appliance under consideration such as for example a UPC barcode, an RFID tag, or the like; etc. Once entry of such identification information is complete, a user may initiate a compatibility check by once again selecting "next" 614.

At step 220, a compatibility check algorithm may be performed. The factors considered in this process may be similar to those previously enumerated above, but excluding for example cost and dimensions since these are no longer variables. In addition, the compatibility check may incorporate further steps such as verifying that a sufficient number of suitable connections and input/output ports are available to allow optimal integration of the proposed appliance, etc. Once compatibility checking is complete, at step 220 the result may be displayed to the user as illustrated at screen 620. An exemplary display may include a summary 622 of the salient points considered in determining compatibility. Some embodiments may include an option for the display of additional information screens containing, for example, recommended interconnection schemes and methods, etc., which in the illustrative example may be accessible via icon 624. In addition, options for posting to Facebook 424 and locating a merchant 428 may be offered as previously described.

While various concepts have been described in detail, it will be appreciated by those skilled in the art that various modifications and alternatives to those concepts could be developed in light of the overall teachings of the disclosure. For example, while the user interface portion of the illustrative product recommendation system and method described takes the form of a smart device app, it will be appreciated that other embodiments are possible, for example in the form of a PC or Web tablet application, either locally resident or server-based. Additionally, while the databases used for storing setup and configuration information, command code sets, and product feature/function reference may for simplicity be illustrated herein as co-located on a single Web server, it will be appreciated that individual data sets may be located across a multiplicity of servers as long as all are accessible to the product recommendation application. Accordingly, it will be appreciated that the method described herein could be implemented in general as computer-executable software associated with one or more network servers, i.e., a hardware platform, with the software being stored on a computer-readable media embodied in a physical device such as a hard disk drive, memory card, and the like.

Further, while described in the context of functional modules and illustrated using flowcharts and/or block diagrams, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents and patent applications cited within this document are hereby incorporated by reference in their entirety.

What is claimed is:

1. A computer-readable media embodied in one or more non-transitory, physical memory devices having stored thereon instructions for checking appliance compatibility for a system user, the instructions performing steps, comprising:
    receiving from a product recommendation application resident on a smart device first information wherein the first information functions to identify a first appliance being considered for integration into a system which includes a second appliance;
    causing the product recommendation application resident on the smart device to obtain from a universal remote control application resident on the smart device second information wherein the second information was previously provided to the remote control application resident on the smart device during a process used to configure the remote control application resident on the smart device to control functional operations of the second appliance and wherein the second information functions to identify the second appliance;
    receiving from the product recommendation application resident on the smart device the second information;
    using the first information to extract from a database, in which is maintained for each of a plurality of appliances an appliance record comprising one or more features for the corresponding appliance, one or more features for an appliance corresponding to the first information;
    using the second information to extract from the database one or more features for an appliance corresponding to the second information;
    using a compatibility check algorithm to determine if the one or more features for the appliance corresponding to the first information as extracted from the database and the one or more features of the appliance corresponding to the second information as extracted from the database indicate that the appliance corresponding to the first information is compatible for integration into the system which includes the appliance corresponding to the second information; and
    presenting to the system user a result of the determination obtained via use of the compatibility check algorithm.

2. The computer-readable media as recited in claim 1, wherein the compatibility check algorithm verifies that a sufficient number of suitable connections and input/output ports are available to allow optimal integration of the t appliance corresponding to the first information into an existing audio and/or visual system configuration which includes the appliance corresponding to the second information.

3. The computer-readable media as recited in claim 1, wherein the result of the determination obtained via use of the compatibility check algorithm includes a summary of one or more features considered by the compatibility check algorithm.

4. The computer-readable media as recited in claim 1, wherein the results of the determination obtained via use of the compatibility check algorithm includes an option for the display of additional information screens containing recommended interconnection schemes for integrating the first appliance into the existing audio and/or visual system configuration.

5. The computer-readable media as recited in claim 1, wherein the results of the determination obtained via use of the compatibility check algorithm includes an option for posting to a social networking site information representative of the first appliance for receiving feedback from others.

6. The computer-readable media as recited in claim 1, wherein the results of the determination obtained via use of the compatibility check algorithm includes an option to locate a merchant offering the appliance corresponding to the first information.

7. The computer-readable media as recited in claim 1, wherein the instructions receive information from the system user that functions to identify a one of the plurality of appliances in an existing audio and/or visual system configuration which is to be replaced by the first appliance and the compatibility check algorithm functions to determine if the one or more features for the appliance corresponding to the first information are compatible with one or more features of each remaining ones of the plurality of appliances in the existing audio and/or visual system configuration.

* * * * *